United States Patent
He et al.

(10) Patent No.: US 8,154,656 B2
(45) Date of Patent: Apr. 10, 2012

(54) CAPTURE BUFFER CONTROL METHODOLOGY FOR CAPTION CARRIAGE SWITCH

(75) Inventors: Yong He, San Diego, CA (US); Siu-Wai Wu, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 625 days.

(21) Appl. No.: 12/345,128

(22) Filed: Dec. 29, 2008

(65) Prior Publication Data
US 2010/0165194 A1    Jul. 1, 2010

(51) Int. Cl.
*H04N 7/08* (2006.01)
(52) U.S. Cl. .......................... 348/468; 348/461; 348/467
(58) Field of Classification Search .................. 348/468, 348/467, 461, 463, 589, 600; *H04N 7/00, H04N 11/00, 9/74, 9/76, 5/278*
See application file for complete search history.

(56) References Cited

U.S. PATENT DOCUMENTS
2006/0184994 A1 * 8/2006 Eyer et al. ..................... 348/468
* cited by examiner

*Primary Examiner* — Sherrie Hsia
(74) *Attorney, Agent, or Firm* — Stewart M. Wiener

(57) ABSTRACT

A system, method, and computer readable medium for avoiding underflow of a caption buffer in a digital video encoding device. The method receives a sequence of digital video frames, and captions that correspond to the digital video frames in the sequence. The method receives first captions in a first caption carriage, and encodes the first captions, and the corresponding digital video frames, in a compressed video format. The method detects a switch from the first caption carriage to a second caption carriage, and stores second captions in the capture buffer, where each second caption is received in the second caption carriage and corresponds to one of the digital video frames in the sequence. The method examines the capture buffer and the second captions to determine whether underflow of the capture buffer is present or absent. When underflow is absent, the method encodes the second captions, and the corresponding digital video frames, in the compressed video format.

21 Claims, 3 Drawing Sheets

CAPTURE BUFFER CONTROL METHODOLOGY FOR CAPTION CARRIAGE SWITCH

BACKGROUND

Digital Television Closed Captioning (DTVCC), formerly known as Advanced Television Closed Captioning (ATVCC), is the migration of the closed-captioning concepts and capabilities developed in the 1970's for National Television System Committee (NTSC) television video signals to the high-definition television environment defined by the Advanced Television (ATV) Grand Alliance and standardized by the Advanced Television Systems Committee (ATSC). This new environment provides for larger screens, higher screen resolutions, enhanced closed captions, and higher transmission data rates for closed-captioning. The Electronic Industries Alliance publication EIA-708 is the standard for closed captioning for ATSC television streams in the United States and Canada. The U.S. Federal Communications Commission (FCC) regulations require EIA-708 caption decoders in all 13-inch (33-cm) diagonal or larger digital televisions. Furthermore, the FCC regulations require some broadcasters to caption a percentage of their broadcasts.

EIA-708 captions for DTV provide for different carriage methods before and after the encoder. The EIA-708 captions may be carried on a serial data link (RS232) from a caption server to the encoder as specified in Society of Motion Picture and Television Engineers (SMPTE) 333M, or embedded in a caption distribution packet (CDP) in serial digital video vertical ancillary (VANC) data for recording and distribution as specified in SMPTE 334M. High-Definition (HD) program distribution from networks to affiliates or member stations usually use compressed video over satellite. Therefore, the program must extract captions and place them in private data packet identifier (PID) or A/53B video user data. Different video programs have different DTVCC carriage, and an HD encoder should be able to extract captions from both caption carriage methods and handle carriage switch on the fly. Due to the different way of capturing and organizing the captions of SMPTE 333M and SMPTE 334M, the unpredictable switch between SMPTE 333M and SMPTE 334M can cause capture buffer underflow and impact the EIA-708 caption distribution.

Thus, there is a demand for a buffer control method and system that handles unpredictable caption carriage switch to improve the efficiency of caption distribution. The presently disclosed invention satisfies this demand.

SUMMARY

Aspects of the present invention provide a system and method for avoiding underflow of a caption buffer in a digital video encoding device. In an embodiment, the method receives a sequence of digital video frames, and captions that correspond to the digital video frames in the sequence. The method receives first captions in a first caption carriage, and encodes the first captions, and the corresponding digital video frames, in a compressed video format. The method detects a switch from the first caption carriage to a second caption carriage, and stores second captions in the capture buffer, where each second caption is received in the second caption carriage and corresponds to one of the digital video frames in the sequence. The method examines the capture buffer and the second captions to determine whether underflow of the capture buffer is present or absent. When underflow is absent, the method encodes the second captions, and the corresponding digital video frames, in the compressed video format.

DETAILED DESCRIPTION

Figure 1:
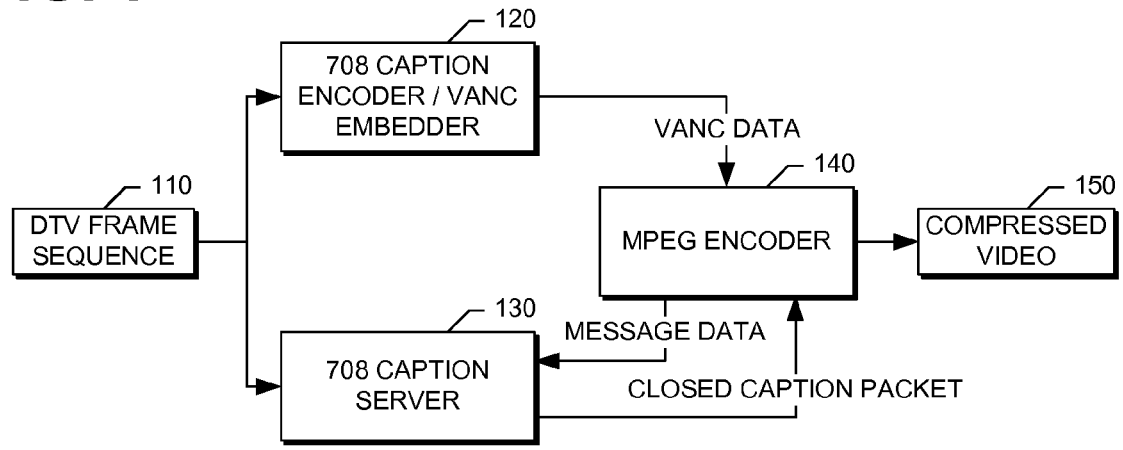
FIG. 1 is block diagram that illustrates one embodiment of the hardware components of a system that performs the present invention.

FIG. 1 is block diagram that illustrates one embodiment of the hardware components of a system that performs the present invention. As shown in FIG. 1, a DTV frame sequence 110 is input to both a 708 caption encoder/VANC embedder 120, and a 708 caption server 130. The 708 caption encoder/VANC embedder 120 and the 708 caption server 130 both generate caption data that is input to a Moving Picture Experts Group (MPEG) encoder 140. The 708 caption encoder/VANC embedder 120 sends the caption data to the MPEG encoder 140 as VANC data. The 708 caption server 130 receives message data from the MPEG encoder 140 and sends the caption data to the MPEG encoder 140 in a closed caption packet. The MPEG encoder 140 combines the DTV frame sequence 110 with the caption data to generate compressed video 150 as output.

When the MPEG encoder 140 receives the caption data as VANC data from the 708 caption encoder/VANC embedder 120, the encoder scans the VANC data and retrieves the embedded EIA-708 caption data for every frame. The 708 caption encoder/VANC embedder 120 packetizes the caption data into the user data as specified in SMPTE 334M. In film mode, the drop field/frame's caption data has to merge with the repeat-first-field field/frame's caption data to avoid caption loss during the detelecine process.

When the MPEG encoder 140 receives the caption data from the 708 caption server 130, the MPEG encoder 140 sends messages to the 708 caption server 130 to indicate status and request additional data. The 708 caption server 130 shall send a closed caption packet to the encoder when there is new caption service information available for transmission. The message exchange protocol between the MPEG encoder 140 and the 708 caption server 130 is specified in SMPTE 333M.

Different video program that generate the DTV frame sequence 110 may have different caption carriage and the program operator should be able to switch the carriage between SMPTE 333M and SMPTE 334M. Due to the different way of capturing and organizing the captions of SMPTE 333M and SMPTE 334M, the unpredictable switch between SMPTE 333M and SMPTE 334M can cause capture buffer underflow and impact the EIA-708 caption distribution.

Figure 2:
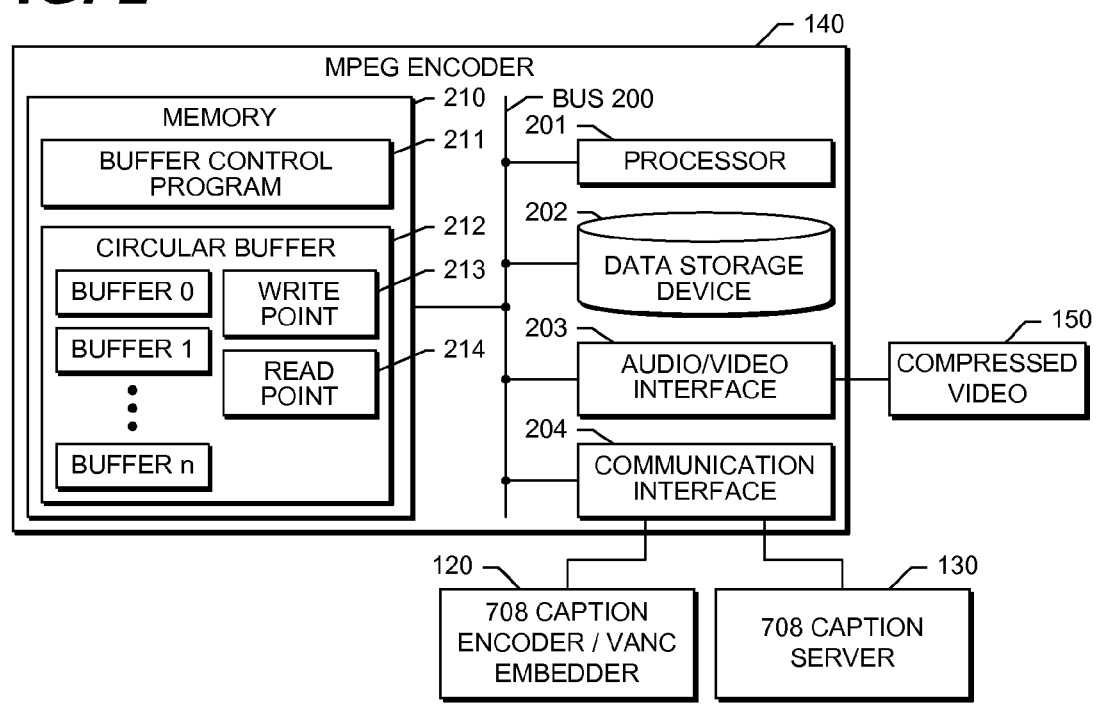
FIG. 2 is a block diagram that illustrates, in detail, one embodiment of the hardware components shown in FIG. 1.

FIG. 2 is a block diagram that illustrates, in detail, one embodiment of the hardware components shown in FIG. 1. In particular, FIG. 2 illustrates the hardware components and software comprising the MPEG encoder 140.

The MPEG encoder 140 shown in FIG. 2 is a general-purpose computer that performs the present invention. A bus 200 is a communication medium that connects a processor 201, data storage device 202 (such as a disk drive, flash drive, flash memory, or the like), audio/video interface 203, communication interface 204, and memory 210. The audio/video interface 203 transmits and receives the messages and data that comprise a compressed video 150 stream. The communication interface 204 transmits and receives the messages and data necessary to communicate with the 708 caption encoder/VANC embedder 120 and the 708 caption server 130.

The processor 201 performs the disclosed methods by executing the sequences of operational instructions that comprise each computer program resident in, or operative on, the memory 210. The reader should understand that the memory 210 may include operating system, administrative, and database programs that support the programs disclosed in this application. In one embodiment, the configuration of the memory 210 of the MPEG encoder 140 includes a buffer control program 211, and a circular buffer 212. The circular buffer 212 includes a number of buffers, buffer 0 through buffer n, and a write point 213 and a read point 214. In one embodiment, the number of buffers is 32, where each buffer is of a size that is appropriate to store the maximum caption data captured per field. The buffer control program 211 and circular buffer 212 perform the method of the present invention disclosed in detail in FIG. 3, FIG. 4, and FIG. 5. These computer programs store intermediate results in the memory 210, or data storage device 202. In another embodiment, the memory 210 may swap these programs, or portions thereof, in and out of the memory 210 as needed, and thus may include fewer than all of these programs at any one time.

Figure 3:
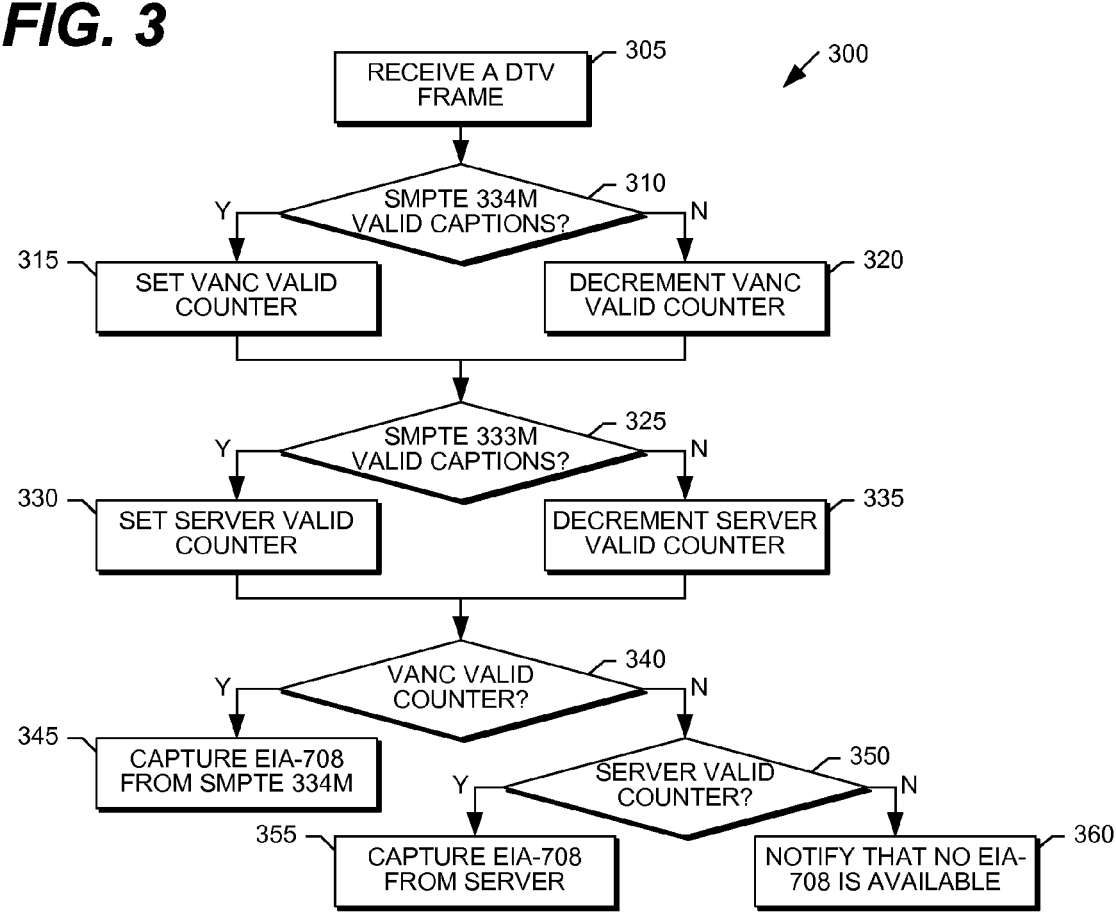
FIG. 3 is a flow chart that illustrates a method for avoiding underflow of a caption buffer according to an embodiment of the present invention.

FIG. 3 is a flow chart that illustrates a method for avoiding underflow of a caption buffer according to an embodiment of the present invention. With reference to FIG. 1 and FIG. 2, the process 300 shown in FIG. 3 begins when the MPEG encoder 140 receives a DTV frame (step 305). The MPEG encoder 140 may receive caption data in both the SMPTE 333M and SMPTE 334M carriage. If both carriage types are available, the MPEG encoder 140 will choose the one that has a higher priority. If only one caption data type is available, the MPEG encoder 140 will switch to the carriage type that contains the valid caption data.

As shown in FIG. 3, the process 300 continues by determining whether SMPTE 334M caption data is valid in the DTV frame (step 310). In one embodiment, the availability of EIA-708 from SMPTE 334M carriage may be detected from the flag smpte334_valid from the VANC scan results. Since the valid caption data may not be presented in every frame, a valid counter is used to indicate the carriage switch. If the SMPTE 334M caption data is valid (step 310, Y branch), the process 300 sets a VANC valid counter (step 315). If the SMPTE 334M caption data is not valid (step 310, N branch), the process 300 decrements the VANC valid counter (step 320).

The process 300 shown in FIG. 3 then determines whether SMPTE 333M caption data is valid in the DTV frame (step 325). In one embodiment, the availability of EIA-708 from SMPTE 333M carriage may be detected from the flag smpte333_valid from the caption server. Since the valid caption data may not be presented in every frame, a valid counter is used to indicate the carriage switch. If the SMPTE 333M caption data is valid (step 325, Y branch), the process 300 sets a server valid counter (step 330). If the SMPTE 333M caption data is not valid (step 310, N branch), the process 300 decrements the server counter (step 335).

Next, the process 300 shown in FIG. 3 selects the carriage type by first determining whether the VANC valid counter is set (step 340). If the VANC valid counter is set (step 340, Y branch), the process 300 captures EIA-708 from SMPTE 334M (step 345) from the 708 caption encoder/VANC embedder 120. If the VANC valid counter is not set (step 340, N branch), the process 300 determines whether the server valid counter is set (step 350). If the server valid counter is set (step 350, Y branch), the process 300 captures EIA-708 from the 708 caption server 130 (step 355). If the server valid counter is not set (step 350, N branch), the process 300 sends a notification that no EIA-708 is available (step 360) for the DTV frame sequence 110.

In one embodiment, the MPEG encoder 140 implements the following software algorithm for the process 300 shown in FIG. 3.

```
If (smpte334_valid)
    Vanc_valid_counter = 16;
else
    Vanc_valid_counter = (Vanc_valid_counter == 0) ?
    0 : (Vanc_valid_counter --);
If (smpte333_valid)
    server_valid_counter = 16;
else
    server_valid_counter = (server_valid_counter == 0) ?
    0 : (server_valid_counter --);
if (Vanc_valid_counter)
    capture_EIA708_from_smpte334 ( );
else if (server_valid_counter)
    capture_EIA708_from_server ( );
else
    no_EIA708_available ( );
```

Figure 4:
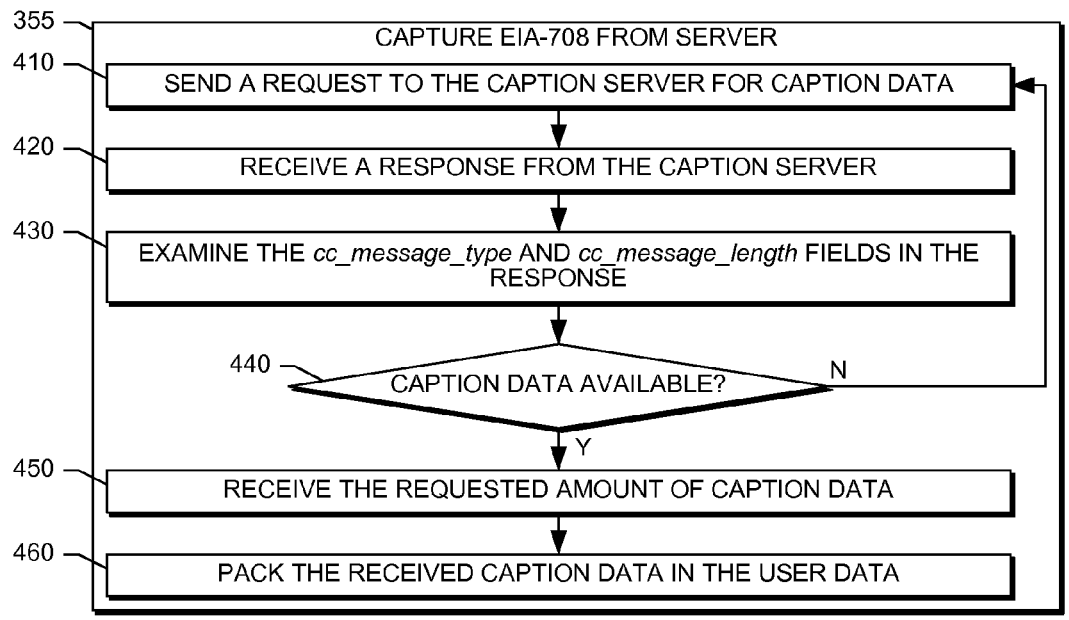
FIG. 4 is a flow chart that illustrates an embodiment of the method shown in FIG. 3.

FIG. 4 is a flow chart that illustrates an embodiment of the method shown in FIG. 3. In particular, FIG. 4 illustrates the process of capturing EIA-708 from the 708 caption server 130 (step 355).

With reference to FIG. 1 and FIG. 2, the process of capturing EIA-708 from the 708 caption server 130 (step 355) shown in FIG. 4 begins with the MPEG encoder 140 sending a request to the caption server 130 for caption data (step 410). In one embodiment, the MPEG encoder 140 requests the caption data from the caption server 130 for every non-drop field/frame. The caption server 130 receives the request, generates a response, and sends the response to the MPEG encoder 140. The MPEG encoder 140 receives the response from the caption server 130 (step 420), and examines the cc_message_type and cc_message_length fields (as described in the SMPTE 333M specification) in the response (step 430). Based on this examination, the MPEG encoder 140 determines whether caption data is available in the response (step 440). If caption data is not available (step 440, N branch), the MPEG encoder continues sending requests to the caption server 130 for caption data (step 410). If caption data is available (step 440, Y branch), the MPEG encoder 140 receives the requested amount of caption data (step 450) and packs the received data in the user data portion of the compressed video 150 (step 460).

Figure 5:
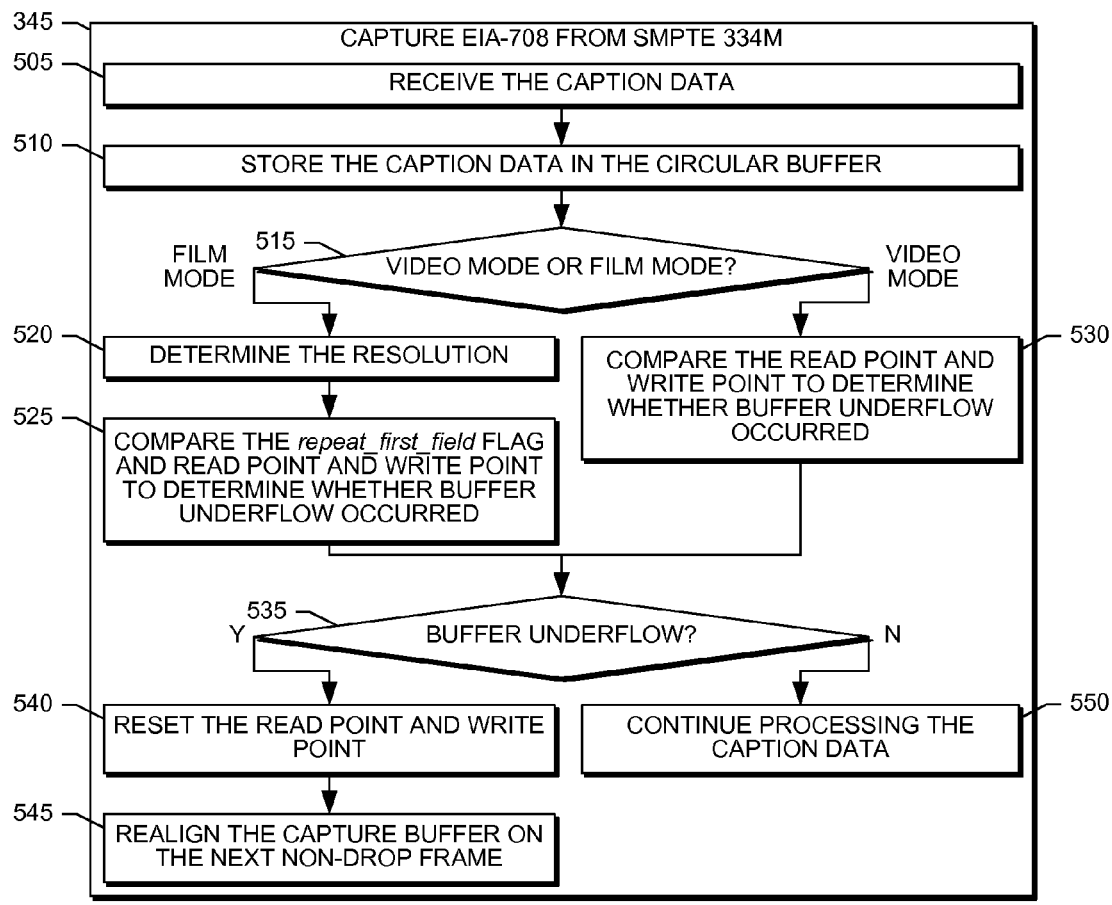
FIG. 5 is a flow chart that illustrates an embodiment of the method shown in FIG. 3.

FIG. 5 is a flow chart that illustrates an embodiment of the method shown in FIG. 3. In particular, FIG. 5 illustrates the process of capturing EIA-708 from SMPTE 334M (step 345).

With reference to FIG. 1 and FIG. 2, the process of capturing EIA-708 from SMPTE 334M (step 345) shown in FIG. 5 begins with the MPEG encoder 140 receiving caption data from the 708 caption encoder/VANC embedder 120 (step 505). The MPEG encoder 140 stores the caption data for every field/frame to handle the caption data of drop field/frame in film mode in the circular buffer 212 (step 510), buffer 0, buffer 1, . . . , buffer n. In one embodiment, the circular buffer 212 comprises thirty-two (32) buffers to store the caption data where each buffer is able to store the maximum caption data captured per field. The circular buffer 212 further includes a write point 213 and a read point 214. The write point 213 (wPtr) is used to indicate the next buffer available to receive caption data. The write point 213 increments by one (1) per field (for 1080i and 1440i resolutions) or frame (for 720P resolution). The read point 214 (rPtr) is used to indicate the buffer whose caption data will be packed into the user data. Since the caption data captured in drop field/frame has to be merged with the data of repeat-first-field (rff) field or frame, the read point 214 increments differently per frame based on whether the DTV frame sequence 110 is in video mode or frame mode. In one embodiment, the read point 214 increments by two (2) per frame with rff=0; increments by three (3) per frame with rff=1 for 1080i and 1440i resolution (i.e., drop one (1) field); increments by two (2) per frame with rff=2 for 720P resolution (i.e., drop one (1) frame); and increments by three (3) per frame with rff=4 for 720P resolution (i.e., drop one (2) frames).

Figure 6:
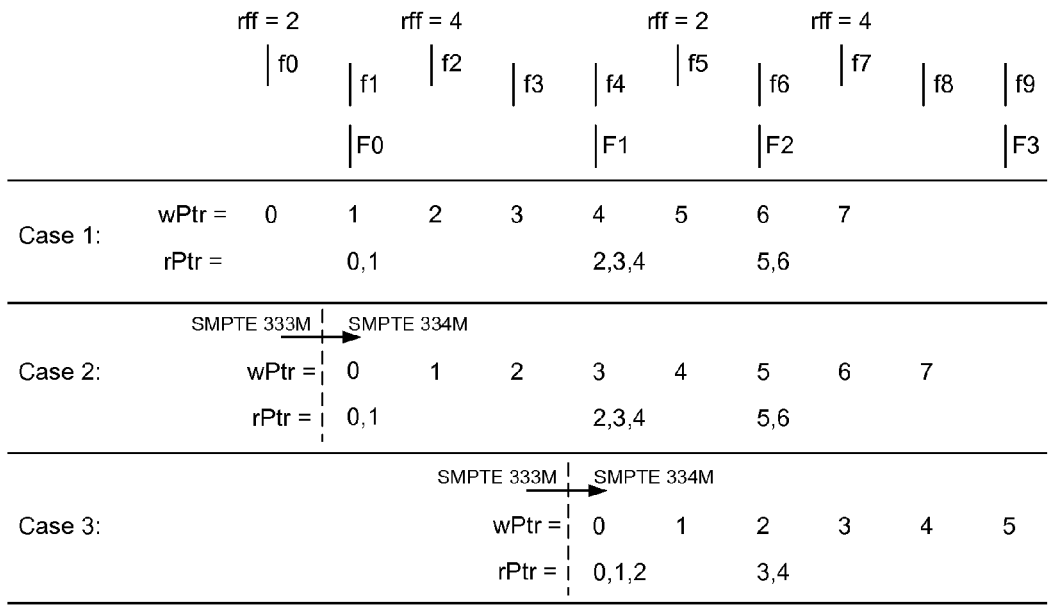
FIG. 6 is a timeline that illustrates an embodiment of the buffer underflow problem resolved by the method shown in FIG. 3.

FIG. 6 is a timeline that illustrates an embodiment of the buffer underflow problem resolved by the method shown in FIG. 3. When switching from SMPTE 333M to SMPTE 334M in 720P resolution film mode, buffer underflow may occur if the MPEG encoder 140 does not have enough captions captured in the circular buffer 212 for merging. The video sequence shown in FIG. 6 includes frame f0, f1, f2, f3, f4, f5, f6, f7, f8, and f9. Of these, frame f1, f3, f4, f6, f8, and f9 are drop frames. The repeat-first-field (rff) of frame f0 and f5 is two (2), which means the next one (1) frame is dropped. The repeat_first_field (rff) of frame f2 and f7 is four (4), which means the next two (2) frames are dropped. After detelecine, the new frame number is F0, F1, F2, and F3. FIG. 6 illustrates three case scenarios to describe the buffer underflow problem resolved by the present invention.

Case 1, as shown in FIG. 6, illustrates a scenario in which no switch occurs from SMTPE 333M to SMPTE 334M, and the sequence always captures captions from SMPTE 334M. Therefore, the write point 213 (wPtr) increments every frame (f), and at the end of the detelecined frame (F), the captions of that frame, including the captions of the drop frame, are retrieved and packetized into the user data. In Case 1, no buffer underflow occurred.

Case 2, as shown in FIG. 6 illustrates a scenario in which the caption carriage is switched from SMPTE 333M to SMPTE 334M. The first frame after the switch is f1, a drop frame. After the switch, the write point 213 (wPtr) starts to increment every frame (f). When the MPEG encoder 140 starts to retrieve the captions from the buffer at the end of F0, it needs two (2) captured buffers (buffer 0 and buffer 1) available since one (1) frame, frame f1, is dropped with this frame time. However, only one buffer contains the captured captions at that moment, and the caption data in buffer 1 is not valid. As a result, the capture buffer is underflowed, and this underflow will last until the carriage switches back to SMPTE 333M.

Case 3, as shown in FIG. 6 illustrates another scenario in which the caption carriage is switched from SMPTE 333M to SMPTE 334M. The first frame after switch is f4, also a drop frame. When the MPEG encoder 140 starts to retrieve the captions of F1, it needs three (3) captured buffers (buffer 0, buffer 1, and buffer 2) since two (2) frames (frame f3 and frame f4) are dropped, but only buffer 0 is valid at the moment. As a result, the capture buffer is underflowed.

Thus, whenever a switch from SMPTE 333M to SMPTE 334M occurs on a drop frame, buffer underflow may occur as a result of different characteristic of two caption carriages. To avoid such capture buffer underflow, the buffer control method of the present invention monitors the buffer level by comparing the write point 213 (wPtr) and read point 214 (rPtr) for video mode and film mode.

Referring again to FIG. 5, with reference to FIG. 1 and FIG. 2, after storing the caption data in the circular buffer 212 (step 510), the process of capturing EIA-708 from SMPTE 334M (step 355) continues with the MPEG encoder 140 determining whether the DTV frame sequence 110 is in film mode or video mode (step 515). If the DTV frame sequence 110 is in film mode (step 515, FILM MODE branch), the MPEG encoder 140 determines the resolution (step 520), and based on that resolution compares the repeat_first_field flag, and the read point 214 and write point 213 to determine whether buffer underflow occurred (step 525). If the DTV frame sequence 110 is in video mode (step 515, VIDEO MODE branch), the MPEG encoder 140 compares the read point 214 and write point 213 to determine whether buffer underflow occurred (step 530). If capture buffer underflow occurred (step 535, Y branch), the MPEG encoder 140 resets the read point 214 and write point 213 (step 540), and realigns the capture buffer on the next non-drop frame (step 545). If capture buffer underflow did not occur (step 535, N branch), the MPEG encoder 140 continues processing the caption data (step 550).

In one embodiment, the MPEG encoder 140 implements the following software algorithm to avoid capture buffer underflow, as shown in FIG. 5.

```
As for all video mode of 1080i, 1440i and 720P,
If (rPtr == wPtr)
    buffer_underflow = TRUE;
else
    buffer_underflow = FALSE;
As for film mode of 1080i and 1440i,
If ( (repeat_first_field == 1) && ( (rPtr+2) < wPtr ) )
    buffer_underflow = TRUE;
else
    buffer_underflow = FALSE;
As for film mode of 720P,
If ( (repeat_first_field == 2) && ( (rPtr+1) < wPtr ) )
    buffer_underflow = TRUE;
else if ( (repeat_first_field == 4) && ( (rPtr+2) < wPtr ) )
    buffer_underflow = TRUE;
else
    buffer_underflow = FALSE;
```

In one embodiment, the MPEG encoder 140 implements the following software algorithm to reset the read point 214 and write point 213, as shown in FIG. 5.

```
If (buffer_underflow == TRUE)
{
    buffer.rPtr = 0;
    buffer.wPtr = 0;
}
```

Although the disclosed embodiments describe a fully functioning system and method for avoiding underflow of a caption buffer, the reader should understand that other equivalent embodiments exist. Since numerous modifications and variations will occur to those reviewing this disclosure, the system and method for avoiding underflow of a caption buffer is not limited to the exact construction and operation illustrated and disclosed. Accordingly, this disclosure intends all suitable modifications and equivalents to fall within the scope of the claims.

We claim:

1. A method for avoiding underflow of a caption buffer in a digital video encoding device, comprising:
   receiving a sequence of digital video frames;
   receiving first captions in a first caption carriage, wherein each first caption corresponds to one of the digital video frames in the sequence;
   encoding the first captions, and the corresponding digital video frames, in a compressed video format;
   detecting a switch from the first caption carriage to a second caption carriage;
   storing second captions in the capture buffer, wherein each second caption is received in the second caption carriage, and corresponds to one of the digital video frames in the sequence;
   examining the capture buffer and the second captions to determine whether underflow of the capture buffer is present or absent; and
   encoding the second captions, and the corresponding digital video frames, in the compressed video format when underflow is absent.

2. The method of claim 1, wherein the receiving of the first captions further comprises:
   sending a request for the first captions to a caption server;
   receiving a response to the request from the caption server; and
   examining the response to determine whether the response includes the first captions.

3. The method of claim 1, wherein the encoding of the first captions further comprises:
   storing the first captions in a user data portion of the compressed video format.

4. The method of claim 1, wherein the capture buffer is a circular buffer having a read point and a write point, and wherein the storing of the second captions further comprises:
   receiving each second caption from a caption encoder; and
   storing each second caption at a write point in the capture buffer.

5. The method of claim 4, wherein the examining of the capture buffer and the second captions further comprises:
   identifying a mode and a resolution for the digital video frames in the sequence that correspond to the second captions; and
   comparing the read point and the write point for the capture buffer based on the mode and the resolution to determine whether underflow of the capture buffer is present or absent.

6. The method of claim 5, wherein when underflow is present, the method further comprises:
   resetting the read point and the write point for the capture buffer; and
   realigning the capture buffer on a next digital video frame that is a non-drop frame.

7. The method of claim 1, wherein the first captions are EIA-708 captions, and the first caption carriage is SMPTE 333M from a caption server, and wherein and the second captions are EIA-708 captions, and the second caption carriage is SMPTE 334M from a caption encoder and VANC embedder.

8. A system for avoiding underflow of a caption buffer in a digital video encoding device, comprising:
   a memory device resident in the digital video encoding device; and
   a processor disposed in communication with the memory device, the processor configured to:
   receive a sequence of digital video frames;
   receive first captions in a first caption carriage, wherein each first caption corresponds to one of the digital video frames in the sequence;
   encode the first captions, and the corresponding digital video frames, in a compressed video format;
   detect a switch from the first caption carriage to a second caption carriage;
   store second captions in the capture buffer, wherein each second caption is received in the second caption carriage, and corresponds to one of the digital video frames in the sequence;
   examine the capture buffer and the second captions to determine whether underflow of the capture buffer is present or absent; and
   encode the second captions, and the corresponding digital video frames, in the compressed video format when underflow is absent.

9. The system of claim 8, wherein to receive the first captions, the processor is further configured to:
   send a request for the first captions to a caption server;
   receive a response to the request from the caption server; and
   examine the response to determine whether the response includes the first captions.

10. The system of claim 8, wherein to encode the first captions, the processor is further configured to:
    store the first captions in a user data portion of the compressed video format.

11. The system of claim 8, wherein the capture buffer is a circular buffer having a read point and a write point, and wherein to store the second captions, the processor is further configured to:
    receive each second caption from a caption encoder; and
    store each second caption at the write point.

12. The system of claim 11, wherein to examine the capture buffer and the second captions, the processor is further configured to:
    identify a mode and a resolution for the digital video frames in the sequence that correspond to the second captions; and
    compare the read point and the write point for the capture buffer based on the mode and the resolution to determine whether underflow of the capture buffer is present or absent.

13. The system of claim 12, wherein when underflow is present, the processor is further configured to:
    reset the read point and the write point for the capture buffer; and
    realign the capture buffer on a next digital video frame that is a non-drop frame.

14. The system of claim 8, wherein the first captions are EIA-708 captions, and the first caption carriage is SMPTE 333M from a caption server, and wherein and the second captions are EIA-708 captions, and the second caption carriage is SMPTE 334M from a caption encoder and VANC embedder.

15. A non-transitory computer-readable medium containing instructions for avoiding underflow of a caption buffer in a digital video encoding device, by a method comprising:
    receiving a sequence of digital video frames;

receiving first captions in a first caption carriage, wherein each first caption corresponds to one of the digital video frames in the sequence;

encoding the first captions, and the corresponding digital video frames, in a compressed video format;

detecting a switch from the first caption carriage to a second caption carriage;

storing second captions in the capture buffer, wherein each second caption is received in the second caption carriage, and corresponds to one of the digital video frames in the sequence;

examining the capture buffer and the second captions to determine whether underflow of the capture buffer is present or absent; and encoding the second captions, and the corresponding digital video frames, in the compressed video format when underflow is absent.

16. The computer-readable medium of claim 15, wherein the receiving of the first captions further comprises:

sending a request for the first captions to a caption server;

receiving a response to the request from the caption server; and examining the response to determine whether the response includes the first captions.

17. The computer-readable medium of claim 15, wherein the encoding of the first captions further comprises:

storing the first captions in a user data portion of the compressed video format.

18. The computer-readable medium of claim 15, wherein the capture buffer is a circular buffer having a read point and a write point, and wherein the storing of the second captions further comprises:

receiving each second caption from a caption encoder; and storing each second caption at a write point in the capture buffer.

19. The computer-readable medium of claim 18, wherein the examining of the capture buffer and the second captions further comprises:

identifying a mode and a resolution for the digital video frames in the sequence that correspond to the second captions; and comparing the read point and the write point for the capture buffer based on the mode and the resolution to determine whether underflow of the capture buffer is present or absent.

20. The computer-readable medium of claim 19, wherein when underflow is present, the method further comprises:

resetting the read point and the write point for the capture buffer; and realigning the capture buffer on a next digital video frame that is a non-drop frame.

21. The computer-readable medium of claim 15, wherein the first captions are EIA-708 captions, and the first caption carriage is SMPTE 333M from a caption server, and wherein and the second captions are EIA-708 captions, and the second caption carriage is SMPTE 334M from a caption encoder and VANC embedder.

\* \* \* \* \*